(12) United States Patent
Carter

(10) Patent No.: US 7,467,415 B2
(45) Date of Patent: Dec. 16, 2008

(54) DISTRIBUTED DYNAMIC SECURITY FOR DOCUMENT COLLABORATION

(75) Inventor: Stephen R Carter, Spanish Fork, UT (US)

(73) Assignee: Novell, Inc., Provo, UT (US)

(*) Notice: Subject to any disclaimer, the term of this patent is extended or adjusted under 35 U.S.C. 154(b) by 1037 days.

(21) Appl. No.: 10/813,505

(22) Filed: Mar. 30, 2004

(65) Prior Publication Data

US 2005/0120199 A1    Jun. 2, 2005

Related U.S. Application Data

(63) Continuation-in-part of application No. 10/734,935, filed on Dec. 12, 2003, and a continuation-in-part of application No. 10/770,677, filed on Feb. 3, 2004, now Pat. No. 7,316,027, and a continuation-in-part of application No. 10/765,523, filed on Jan. 27, 2004, now Pat. No. 7,299,493, which is a continuation-in-part of application No. 10/676,231, filed on Sep. 30, 2003.

(51) Int. Cl.
*H04L 9/00* (2006.01)
*H04K 1/00* (2006.01)
*G06F 21/00* (2006.01)

(52) U.S. Cl. ............... 726/27; 713/176; 705/51; 705/59

(58) Field of Classification Search ............... None
See application file for complete search history.

(56) References Cited

U.S. PATENT DOCUMENTS

| | | | |
|---|---|---|---|
| 5,544,322 A | 8/1996 | Cheng et al. | |
| 5,560,008 A | 9/1996 | Johnson et al. | 395/650 |
| 5,706,427 A | 1/1998 | Tabuki | 713/201 |
| 5,737,523 A | 4/1998 | Callaghan et al. | 713/201 |
| 5,787,175 A * | 7/1998 | Carter | 713/165 |
| 5,818,936 A | 10/1998 | Mashayekhi | 380/25 |
| 5,841,970 A | 11/1998 | Tabuki | 395/187.01 |
| 5,848,232 A | 12/1998 | Lermuzeaux et al. | 713/201 |
| 5,913,025 A | 6/1999 | Higley et al. | 395/187.01 |
| 5,933,498 A * | 8/1999 | Schneck et al. | 705/54 |
| 5,999,711 A | 12/1999 | Misra et al. | 395/187.01 |
| 6,014,135 A | 1/2000 | Fernandes | 345/744 |

(Continued)

FOREIGN PATENT DOCUMENTS

WO    WO-0079432 A1    12/2000

OTHER PUBLICATIONS

Aarts, Robert, et al., "Liberty ID-FF Bindings and Profiles Specification", *Liberty Alliance Project*, Version 1.2, (2003),1-61.

(Continued)

*Primary Examiner*—Christopher A Revak
(74) *Attorney, Agent, or Firm*—Schwegman, Lundberg & Woessner, P.A.

(57) ABSTRACT

Techniques are provided for dynamically managing security for document collaboration. A document is associated with a list of collaborators, which can access the document. One collaborator is an identity service. The identity service is capable of dynamically encrypting versions of an access key needed by a collaborator to access the document and capable of dynamically adding or removing collaborators from the list of collaborators.

30 Claims, 3 Drawing Sheets

U.S. PATENT DOCUMENTS

| | | | |
|---|---|---|---|
| 6,088,451 A | 7/2000 | He et al. | |
| 6,092,199 A | 7/2000 | Dutcher et al. | 713/201 |
| 6,108,788 A | 8/2000 | Moses et al. | 713/201 |
| 6,119,230 A | 9/2000 | Carter | 713/200 |
| 6,230,271 B1 | 5/2001 | Wadlow et al. | 713/201 |
| 6,263,446 B1 | 7/2001 | Kausik et al. | 713/201 |
| 6,314,409 B2* | 11/2001 | Schneck et al. | 705/54 |
| 6,343,361 B1 | 1/2002 | Nendell et al. | 713/171 |
| 6,377,692 B1* | 4/2002 | Takahashi et al. | 380/277 |
| 6,430,575 B1 | 8/2002 | Dourish et al. | 707/200 |
| 6,515,316 B1 | 2/2003 | Wojtowicz et al. | 713/201 |
| 6,539,482 B1 | 3/2003 | Blanco et al. | 713/201 |
| 6,718,470 B1 | 4/2004 | Adams | |
| 6,870,842 B1 | 3/2005 | Caronni et al. | |
| 6,891,953 B1* | 5/2005 | DeMello et al. | 380/277 |
| 6,911,974 B2* | 6/2005 | Asano et al. | 345/204 |
| 6,957,261 B2 | 10/2005 | Lortz | |
| 6,981,262 B1* | 12/2005 | DeMello et al. | 719/310 |
| 7,035,828 B2 | 4/2006 | Ketonen et al. | |
| 7,088,822 B2* | 8/2006 | Asano | 380/45 |
| 7,140,044 B2 | 11/2006 | Redlich et al. | |
| 7,167,564 B2* | 1/2007 | Asano et al. | 380/279 |
| 7,203,968 B2* | 4/2007 | Asano et al. | 726/31 |
| 7,224,804 B2* | 5/2007 | Ishiguro et al. | 380/279 |
| 7,237,256 B2 | 6/2007 | Cheng et al. | |
| 7,299,493 B1 | 11/2007 | Burch et al. | |
| 7,316,027 B2 | 1/2008 | Burch et al. | |
| 7,319,752 B2* | 1/2008 | Asano et al. | 380/44 |
| 7,346,170 B2* | 3/2008 | Asano et al. | 380/278 |
| 2001/0034841 A1 | 10/2001 | Shambroom | |
| 2002/0052798 A1 | 5/2002 | Nishikado et al. | |
| 2002/0095571 A1 | 7/2002 | Bradee | |
| 2002/0184310 A1 | 12/2002 | Traversat et al. | |
| 2003/0002521 A1 | 1/2003 | Traversat et al. | |
| 2003/0014631 A1 | 1/2003 | Sprague | |
| 2003/0023880 A1 | 1/2003 | Edwards et al. | 713/201 |
| 2003/0061144 A1 | 3/2003 | Brickell et al. | |
| 2003/0070070 A1 | 4/2003 | Yeager et al. | |
| 2003/0097449 A1 | 5/2003 | Derocher et al. | |
| 2003/0172034 A1* | 9/2003 | Schneck et al. | 705/54 |
| 2003/0172090 A1 | 9/2003 | Asunmaa et al. | |
| 2003/0235309 A1 | 12/2003 | Struik et al | |
| 2004/0128378 A1 | 7/2004 | Blakley, III et al. | |
| 2004/0187031 A1 | 9/2004 | Liddle | |
| 2004/0210771 A1 | 10/2004 | Wood et al. | |
| 2004/0221043 A1 | 11/2004 | Su et al. | |
| 2005/0068983 A1 | 3/2005 | Cater et al. | |
| 2005/0097056 A1* | 5/2005 | DeMello et al. | 705/57 |
| 2005/0172116 A1 | 8/2005 | Burch et al. | |
| 2006/0020549 A1* | 1/2006 | Stranksy | 705/51 |
| 2006/0075473 A1 | 4/2006 | Moreh et al. | |
| 2006/0080529 A1* | 4/2006 | Yoon et al. | 713/168 |
| 2006/0178997 A1* | 8/2006 | Schneck et al. | 705/50 |
| 2007/0143398 A1* | 6/2007 | Graham | 709/204 |
| 2007/0156659 A1* | 7/2007 | Lim | 707/3 |
| 2007/0156670 A1* | 7/2007 | Lim | 707/4 |
| 2007/0156694 A1* | 7/2007 | Lim | 707/9 |
| 2007/0294750 A1 | 12/2007 | Burch et al. | |
| 2008/0134286 A1 | 6/2008 | Amdur et al. | |

OTHER PUBLICATIONS

Aarts, Robert, et al., "Liberty ID-FF Protocols and Schema Specification", *Liberty Alliance Project*, Version 1.2, (2003),1-46.

Madsen, Paul, et al., "Liberty Metadata Description and Discovery Specification", *Liberty Alliance Project*, Version 1.0, (2003),1-33.

"EP Search Report", Received in related matter EP 04104137.7, (Mar. 1, 2005),9 pgs.

Hodges, Jeff, et al., "Oasis SSTC: SAML Security Considerations", Internet Article, 'Online!, www.oasis-open.org, retrieved Feb. 7, 2005, Sections 5.2.1.1 and 5.4.2, XP002316601,(Nov. 14, 2001),1-22.

Rowley, Andrew, "A Security Architecture for Distributed Groupware", *Department of Computer Science, University of London*, (Sep. 1998),142 pgs.

Schneier, B., "Applied Cryptography", 2nd Edition, (1995),185-187.

"U.S. Appl. No. 10/676,231 Non-Final Office Action mailed Jun. 26, 2008.", 19 pgs.

* cited by examiner

US 7,467,415 B2

DISTRIBUTED DYNAMIC SECURITY FOR DOCUMENT COLLABORATION

PRIORITY

The present invention is a Continuation-In-Part and co-pending with commonly assigned U.S. application Ser. No. 10/734,935 filed on Dec. 12, 2003, entitled: "Distributed Dynamic Security Capabilities with Access Controls," the disclosure of which is incorporated by reference herein. Additionally, the present invention is a Continuation-In-Part and with commonly assigned U.S. application Ser. No. 10/770,677 filed on Feb. 3, 2004 now U.S. Pat. No. 7,316,027, entitled: "Techniques for Dynamically Establishing and Managing Authentication and Trust Relationships," the disclosure of which is incorporated by reference herein. Further, U.S. application Ser. No. 10/770,677 is a Continuation-In-Part of U.S. application Ser. No. 10/765,523 filed on Jan. 27, 2004 now U.S. Pat. No. 7,299,493 entitled: "Techniques for Dynamically Establishing and Managing Authentication and Trust Relationships," the disclosure of which is also incorporated by reference herein. Moreover, U.S. application Ser. No. 10/765,523 is a Continuation-In-Part of U.S. application Ser. No. 10/676,231 filed on Sep. 30, 2003 entitled: "Policy and Attribute Based Access to a Resource," this disclosure of which is also incorporated by reference herein.

FIELD OF THE INVENTION

The invention relates generally to collaboration security, and more specifically to techniques for dynamically establishing and managing security with respect to document collaboration.

BACKGROUND OF THE INVENTION

As electronic connectivity increases there has been a greater need to share electronic resources, content, and services. Sharing permits organizations to more efficiently collaborate and maximize resource usage or allocation. However, a number of challenges exist with collaboration. One particular challenge is collaboration security.

A collaboration environment may include a variety of participants or collaborators that are accessing resources, content, or services. Each particular participant may have different access rights or different authentication and identifying information. Thus, the resource, content, or service being accessed needs to manage these disparities for each collaborating participant or some other service needs to actively monitor and manage these disparities on behalf of the resource, content, or service.

Recent beneficial advancements have provided techniques that streamline collaborative security management, such as "Distributed Dynamic Security Capabilities with Access Controls," U.S. application Ser. No. 10/734,935, and commonly assigned to Novell, Inc. of Provo, Utah. These advancements are beneficial for static collaborative security. Similarly, beneficial advancements have been provided for dynamically establishing and managing trust relationships, such as "Techniques for Dynamically Establishing and Managing Authentication and Trust Relationships," U.S. application Ser. No. 10/770,677, and commonly assigned to Novell, Inc. of Provo, Utah. These advancements are useful in establishing and managing dynamic authentication and trust relationships. However, no present or convention technique adequately addresses dynamic security for document collaborative.

Therefore, what is needed are techniques for managing dynamic security associated with document collaboration.

SUMMARY OF THE INVENTION

In various embodiments of the invention, techniques are presented for dynamically managing security associated with document collaboration. A document includes a list of collaborators, a symmetric key for collaborators identified within the list of collaborators, and a separate encrypted version of the symmetric key for each of the collaborators. One special collaborator is an identity service.

The identity service uses a trust specification associated with the document to permit or deny new collaborators to be dynamically added to or removed from the list of collaborators. If a new collaborator is added or removed, then the identity service generates a modified symmetric key and updates the encrypted versions of the modified symmetric key for each of the collaborators. The identity service also dynamically acquires public keys from a number of the collaborators and uses the dynamically acquired public key to generate an encrypted version of the symmetric key for the needing collaborators.

DETAILED DESCRIPTION OF THE INVENTION

Figure 1:
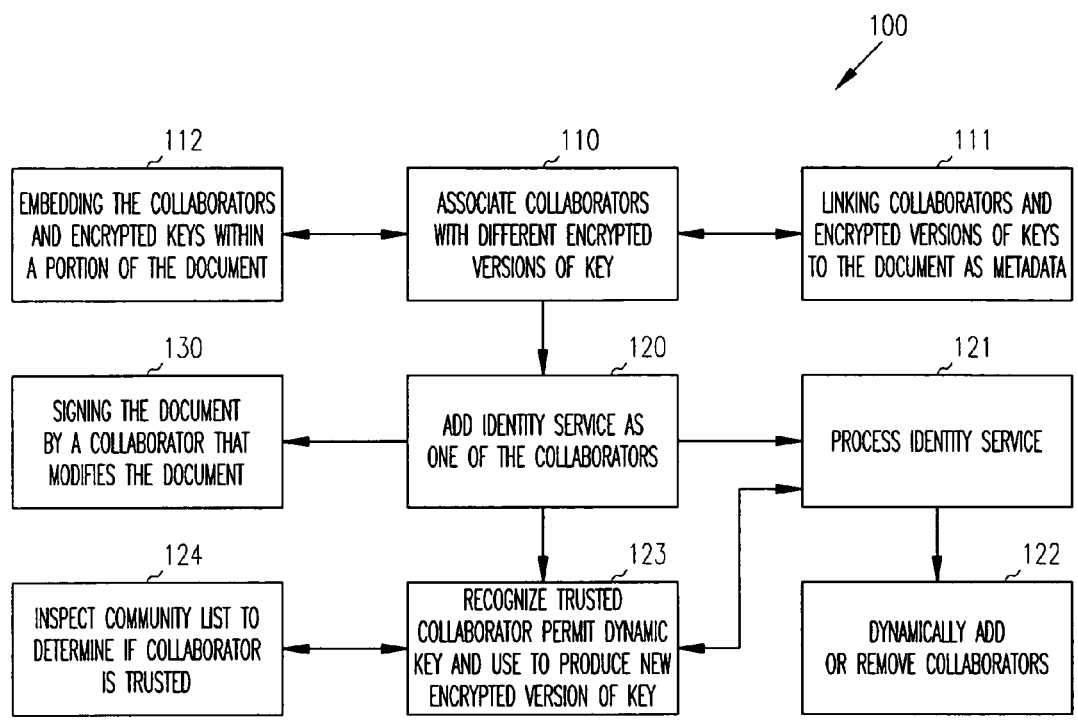
FIG. 1 is a flowchart representing a method for dynamically managing security for document collaboration.

In various embodiments of the invention, the term "document" is used. A document can be a file (e.g., text, image, video, graphic, etc.), a resource (e.g., peripheral, processing device, logical group, object, an executable module, etc.), a directory, or a service. In some embodiments, a device can include its associated logical structures or objects. For example, in a Linux file system the special directory "/dev" contains descriptor files or objects for each device. Thus, in some embodiments, a document is a service being shared and managed by multiple participants. A document is the subject of collaboration with multiple participants over one or more network connections. Participants are synonymous with collaborators. Furthermore, participants and collaborators are synonymous with principals.

A collaborator can itself be a document. In this way, collaborators can be automatic processing entities or special types or documents, such as resources or services. In other instances, collaborators are manual entities (e.g., users), which collaborate with a document using one or more interfaces (e.g., browsers, editors, Application Programming Interfaces (APIs), etc.).

As used herein and below a "community list" is a data structure associated with a particular document or collaborator. The entries of the community list include identifiers for other different documents of collaborators which whom the particular document or collaborator may interact. Each identifier is also associated with metadata, the metadata includes indications as to whether a document or collaborator identified by a particular identifier must be in a trusted relationship, should be in a trusted relationship, may be in a trusted relationship, should not be in a trusted relationship, or must not be in a trusted relationship with the collaborator or document that is associated with a particular instance of the community list.

An identity service interacts with documents and collaborators and one or more identity stores housing trust specifications, contracts, identity information, and attribute information about the documents and collaborators. A trust specification defines policies, secure communications, and the like for a particular collaborator or document. A contract is a specific set of policies and authentication techniques for a particular collaborator or document relationship to another collaborator or document.

Identity information includes authentication information and techniques used to authenticate a collaborator or document to the identity service or to another collaborator or document. Identity information can also include the techniques needed to properly perform authentication. Attribute information is associated with confidential information (e.g., Social Security Number (SSN), email address, credit card number, etc.) of a collaborator or document. Policies define operations that are permissible or not permissible against identity information or attribute information. In various embodiments presented with this invention an identity service is a particular collaborator associated with a document, which manages dynamic security on behalf of that document.

A structure and technique for providing security with a document can be found in U.S. Pat. No. 6,119,230, entitled "Distributed Dynamic Security Capabilities", and commonly assigned to Novell, Inc. of Provo, Utah; the disclosure of which is incorporated by reference herein. Techniques for customizing the access rights of collaborators associated with a document can be found in U.S. application Ser. No. 10/734,935, entitled "Distributed Dynamic Security Capabilities with Access Controls, and commonly assigned to Novell, Inc. of Provo, Utah; the disclosure of which is incorporated by reference herein. Techniques for dynamically establishing and managing authentication and trust relationships can be found in U.S. application Ser. No. 10/770,677, entitled "Techniques for Dynamically Establishing and Managing Authentication and Trust Relationships," and commonly assigned to Novell, Inc. of Provo, Utah.

Various embodiments of this invention can be implemented in existing network products and services. For example, in some embodiments, the techniques presented herein are implemented in whole or in part in the iChain®, Border Manager®, and Excelerator® products distributed by Novell, Inc., of Provo, Utah.

Of course, the embodiments of the invention can be implemented in a variety of architectural platforms, systems, or applications. For example, portions of this invention can be implemented in whole or in part in any distributed architecture platform, operating systems, proxy services, or browser/client applications. Any particular architectural layout or implementation presented herein is provided for purposes of illustration and comprehension only and is not intended to limit the various aspects of the invention.

FIG. 1 is a flowchart representing one method 100 for dynamically managing security associated with document collaboration. The method 100 is implemented as one or more applications or services which reside in a computer-accessible medium and is accessible over a network. In one embodiment, the method 100 is implemented as a service that interfaces with a document that is the subject of collaboration with one or more collaborators. In another embodiment, the method 100 is implemented within the document and forms a sub-service for the document that establishes and manages document security during collaboration. The method 100 (herein after "processing") also interacts with a special collaborator referred to as an identity service and defined above.

A document is the subject of dynamic collaboration, that document maintains or is associated with a list of collaborators. The list includes, among other things, identities for each unique collaborator that can permissibly access the content or services of the document. In other embodiments, the list may also include identities of unique collaborators that may not permissibly access the content or services of the document. Collaborator identifications which can permissibly access the document are used to generate a symmetric key that includes all valid identifications which can access the document. If the symmetric key is provided to the document, then access to its services or content is provided to the entity presenting the valid symmetric key. Correspondingly, that symmetric key is closely guarded and controlled by the document or sub-services of the document.

Each collaborator's identification, which can access the document, may be associated with an encrypted version of symmetric key. Each encrypted version is unique to a particular collaborator. One technique for achieving this is to encrypt each collaborator's version of the symmetric key with that particular collaborator's public key. In this way, only the proper collaborator having a corresponding private key can decrypt the encrypted symmetric key and thus access the document.

In some instances collaborators may be used for purposes of generating the symmetric key, but these collaborators may not have public keys or may not have communicated the public keys to the processing. In these instances, these particular collaborator identifications will not have any encrypted symmetric key information and will dynamically establish their public keys in the manners discussed herein and below.

The list of collaborators can also be associated with specific access control rights or edit rights associated with each particular document collaborator. Moreover, the document is, in some embodiments, associated with a trust specification which is managed by the identity service. The trust specification includes global policies and identifies specific relationships between the document and other documents or collaborators; these specific relationships are each defined within a contract. Moreover, in some embodiments, the document is associated with a community list, which identifies collaborators with which the document may or may not enter into a trusted relationship with. The trust specification, contracts, and community list of the document are managed and controlled by the identity service, which is a special type of collaborator identified within the document's collaborator's list.

At 110, the processing associates collaborators with different versions of the symmetric key, which permits access to the document. The different versions are encrypted for each particular collaborator. The encrypted versions need not reside within the list of collaborators, although in some instances it can reside within the list of collaborators. For example, the encrypted version can be linked with the proper collaborator identifications included within the list of collaborators. Alternatively, particular collaborator identifications can be used to search another data structure of data store for the proper encrypted versions of the symmetric key. Additionally, not all collaborators need to include information for acquiring the encrypted key. That is, some collaborators may not have communicated a public key to the processing when the symmetric key was generated. Alternatively, some encrypted versions may not be dynamically usable by a particular collaborator, such as when that particular collaborator dynamically changes or alters its public key.

In one embodiment, at 111, the collaborators (e.g., list of collaborator identifications) and their associated encrypted versions of the symmetric key are linked or otherwise indexed to the document as metadata. Thus, the processing can access the metadata for purposes of dynamically managing the security of the document (as is discussed below). In an alternative embodiment, at 112, the list of collaborator identifications and their associated encrypted versions of the symmetric key are embedded within a portion of the document. Again, the processing is a sub-service of the document and thus has access to this portion of the document for purposes of managing dynamic security.

At 120, the processing includes or adds (at initialization) an identity service as a collaborator to the list of collaborator identifications. The identity service interacts with the document, the collaborators, the list of collaborators, and the processing for purposes of assisting the processing in dynamically managing security for the document. Additionally, the identity service interacts with one or more identity stores for purposes of acquiring, inspecting, and interpreting one or more trust specifications, contracts, and community lists associated with the document and the collaborators. The identity service is in a trusted and secure relationship with the document and the processing.

After the identity service is added as a collaborator at 120, the identity service is notified by the processing of that status or alternatively the identity service is processed or initiated at 121. During operation, the identity service interacts with the processing to dynamically manage security for the document. This includes managing the collaborators, the symmetric key, and the encrypted versions of the symmetric key. In some embodiments, the processing is actually an extension or a service of the identity service, such that the document is under the direct control and influence of the identity service.

During operation, at 122, the identity service can dynamically add or remove collaborators from the list of collaborators associated with the document. When this occurs, the identity service will regenerate a new symmetric key for accessing the document, since the identities which can access the document will have changed. Additionally, each encrypted version of the newly generated symmetric key is re-produced by the identity service. It should also be noted that the processing can be instructed by the identity service to add or remove a collaborator, which will force the processing to generate a new symmetric key and generate new versions of the encrypted symmetric key. Thus, either the identity service or the processing can add or remove collaborators from the list of collaborators.

Regardless of who actually dynamically adds or removes a collaborator from the list of collaborators, it is the identity service that makes the initial determination that a particular collaborator should be added or removed from the list. To do this, the identity service inspects a trust specification associated with the document and a particular collaborator. That specification may identify a contract that defines the relationship between the particular collaborator and the document. The contract defines policies and defines authentication requirements and identity information which may be required before the particular collaborator can be dynamically added to the list of document collaborators. Once the identity service has satisfied itself that events or conditions are appropriate for adding or removing a collaborator, the identity service or processing actually adds or removes the particular collaborator.

At 123, it may be that a collaborator does not need to be added or removed from the list of document collaborators, but it may be that a particular collaborator either does not have a private key need to encrypt its public-key encrypted version of the symmetric key, that the particular collaborator has never communicated a public key and thus has no encrypted version of the symmetric key, or that the particular collaborator has dynamically changed its public-private key pairs and therefore needs a new encrypted version of the symmetric key.

When a particular collaborator lacks a private key associated with the public key that was used to encrypt the symmetric key, the identity service can be used to communicate that needed private key to the collaborator. This situation may occur with the collaborator is using a different computing device or connecting to a network through a different connection (e.g., collaborator uses a laptop and goes mobile connecting through a different Internet Service Provider (ISP)). In these situations, if the collaborator has registered with a keying service (e.g., Verisign) that provides strongly rooted public-private key pairs, then the identity service can be used as an intermediary for the collaborator to authenticate to and acquire from the keying service its strongly rooted private key. The specific technique for dynamically achieving this is available in U.S. application Ser. No. 10/770,677, entitled "Techniques for Dynamically Establishing and Managing Authentication and Trust Relationships," and commonly assigned to Novell, Inc. of Provo, Utah; the disclosure of which is incorporated by reference herein. In still another embodiment, the identity service can generate a key pair and sign the public key certificate, locally. If the identity service's key is strongly rooted then this new key pair will be strongly rooted. If strongly rooted keys are not need then either the collaborator's client or the identity service can produce key pairs and self sign them.

When a collaborator has never communicated a public key, the collaborator can authenticate to the identity service; the identity service validates the trust specification and proper contract and acquires the public key from the collaborator. Next, the identity service encrypts the documents symmetric key with the newly provided public key or alternatively the identity service asks the processing to encrypt a version of the symmetric key for the collaborator to use. In a similar manner, the identity service is used when the collaborator dynamically changes its public key, which requires a new encrypted version of the document's symmetric key.

In some embodiments, at 124, the identity service inspects and maintains a community list on behalf of the document and the collaborators. This community list may identify conditions and relationships which are permissibly allowed, not allowed, or extinguished based on a particular condition or event being detected. The document's community list permits the identity service to determine if a particular collaborator can enter into a trusted relationship with the document.

At 130, and in some embodiments, the document can include added security such as when the document is digitally signed by a last modifying collaborator. In this manner, when a particular collaborator modifies the document that collaborator signs the document. When a next collaborator accesses the document, it checks the signature to ensure that the document has not been compromised and was edited by a trusted partner (authorized collaborator). However, in situations where a particular collaborator has dynamically changed or added its public key, not all of the collaborators will have the needed public key to verify a signature. In these situations, the identity service can be used to distribute (push) or provide upon request (pull) the needed public key, such that all authorized collaborators can acquire the needed public key of a trusted partner for purposes of validating a last signature of the document.

The embodiments of method 100 demonstrate how security can be dynamically modified and altered for purposes of collaborating with a document. An identity service acts as a special authorized collaborator of the document, which interfaces with the method 100 to dynamically manage security and trusted relationships between collaborators.

Figure 2:
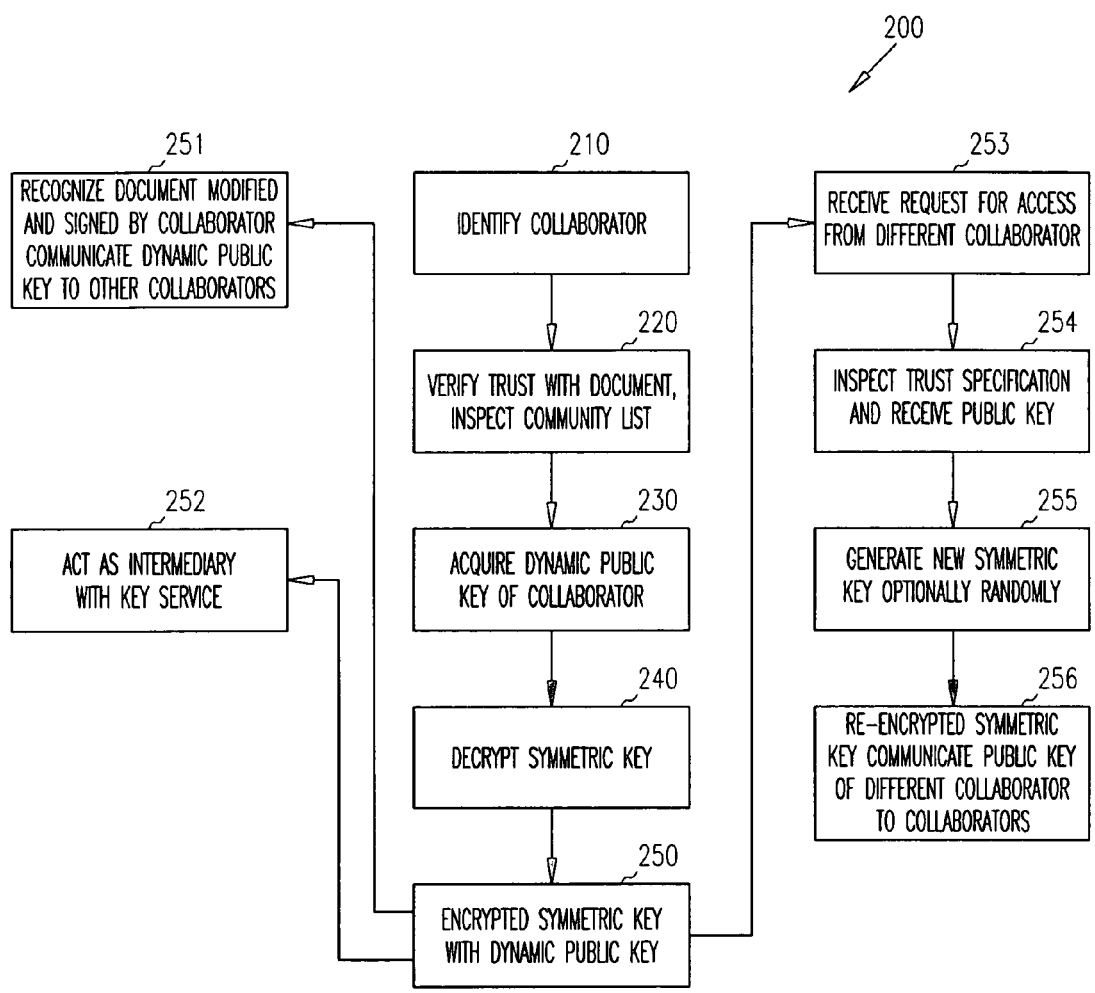
FIG. 2 is a flowchart representing another method for dynamically managing security for document collaboration.

FIG. 2 is a flowchart of another method 200 for dynamically managing security associated with document collaboration. The method 200 is implemented in a computer readable medium and is accessible over any network or combination of networks interfaced together. The method 200 is implemented as a portion or sub-service of an identity service. Correspondingly, the processing of the method 200 is referred to herein as an "identity service." It should be noted that only a subset of the functionality of the identity service is depicted in FIG. 2. The identity service can perform additional functionality, such as what has been disclosed in U.S. application Ser. No. 10/770,677, entitled: "Techniques for Dynamically Establishing and Managing Authentication and Trust Relationships," and commonly assigned to Novell, Inc. of Provo, Utah; the disclosure of which is incorporated by reference herein.

Initially, a list of collaborators associated with a document is configured. One of those collaborators is the identity service, which is invoked or notified at initialization of the list of its role or status. Once the identity service is properly notified or instantiated, the identity service manages dynamic security on behalf of the document during collaboration sessions.

At some point during the life-cycle of managing the security, the identity service identifies a collaborator, at 210, associated with the document's list of authorized collaborators. That collaborator desires to access the document in some manner. However, the collaborator lacks an encrypted version of a symmetric key needed to access the document or lacks a proper key needed to decrypt that symmetric key. Correspondingly, before the identity service provides and configures information needed for the collaborator to acquire the symmetric key, the identity service, at 220, verifies that the collaborator is who it says it is, and verifies that the community list associated with the document, and optionally the collaborator, permits a dynamic trusted relationship with the document. If this is satisfied processing continues but, if this is not satisfied processing terminates at 220 (not shown in FIG. 2).

Assuming the collaborator is permitted to enter into a dynamic trusted relationship with the document and is authenticated to the identity service and the document, then, at 230, the identity service acquires a dynamic public key associated with the collaborator. That dynamic public key can be acquired from a community list associated with the collaborator, can be acquired from identity stores associated with the collaborator, or can be directly communicated from the collaborator to the identity service.

Once the newly acquired dynamic public key of the collaborator is acquired, the identity service uses its own public key (identity service's public key) and its own private key to decrypt, at 240, the symmetric key. This can be done because the identity service is a collaborator identified in the document's collaborator list. Once the identity service has the decrypted symmetric key, it re-encrypts, at 250, the symmetric key with the collaborator's newly provided dynamic public key.

At this point, the identity service notifies the collaborator that it is free to acquire the needed symmetric key from the document. The collaborator accesses the document, acquires the encrypted version of the symmetric key, uses its new dynamic public key to decrypt the encrypted version of the symmetric key, and uses the symmetric key to access the content or services of the document.

In one embodiment, at 251, the collaborator modifies the document and then signs the changed version of the document. In this embodiment, the other collaborators of the document will not be able to verify the signature of the signing collaborator, since these other collaborators will not have the newly acquired dynamic public key of the signing collaborator. Thus, the identity service can provide that new public key in two fashions. First, the new public key can be dynamically pushed to each of the other collaborators as soon as it is received by the identity service. Second, the new public key can be delivered to a specific requesting collaborator (pull) when a requesting collaborator determines that it cannot verify an existing signature for the document.

At 252, and in some embodiments, the identity service can also act as an intermediary on behalf of the collaborator with a key service (e.g., Verisign). Again, this is useful when the collaborator has a registered strongly rooted key-pair with the key service and is in an environment where its private key is not available. The identity service acts as a secure conduit for the collaborator to acquire its public-private key pair from the key service in a dynamic fashion.

In some embodiments, the identity service may receive, at 253, a request from a different collaborator, which desires to collaborate with the document. When this occurs, the identity service inspects the trust specification, at 254, of the document and any contracts associated with the relationship between the different collaborator and the document and determines if such a dynamic add is permissible. Assuming, that such an add operation is permissible and that the different collaborator is authenticated to the document and identity service, then a public key associated with the different collaborator is acquired by the identity service.

Next, since a new collaborator is being dynamically added to the list of collaborators that can access the document, the symmetric key needs to be re-generated or changed. Correspondingly, at 255, the identity of the different collaborator is used with the identities of the other existing collaborators for purposes of randomly generating a new symmetric key. Finally, at 256, each encrypted version of the prior symmetric key is re-encrypted using the new symmetric key. At this point, the identity service has dynamically added a collaborator to the list of collaborators associated with the document and no notification or action was required by the collaborators. In fact, unless a collaborator needs to validate a signature of a newly added collaborator, the collaborator may never be aware or need to be made aware that a newly added collaborator was added to the list of collaborators.

In a like manner, the identity service can proactively monitor and detect when a condition or event dictates that a particular authorized collaborator needs to be removed from the list of collaborators. In a manner similar to 253-256, the symmetric key is re-generated and re-encrypted to reflect the removal of a specific collaborator from the list of collaborators.

Figure 3:
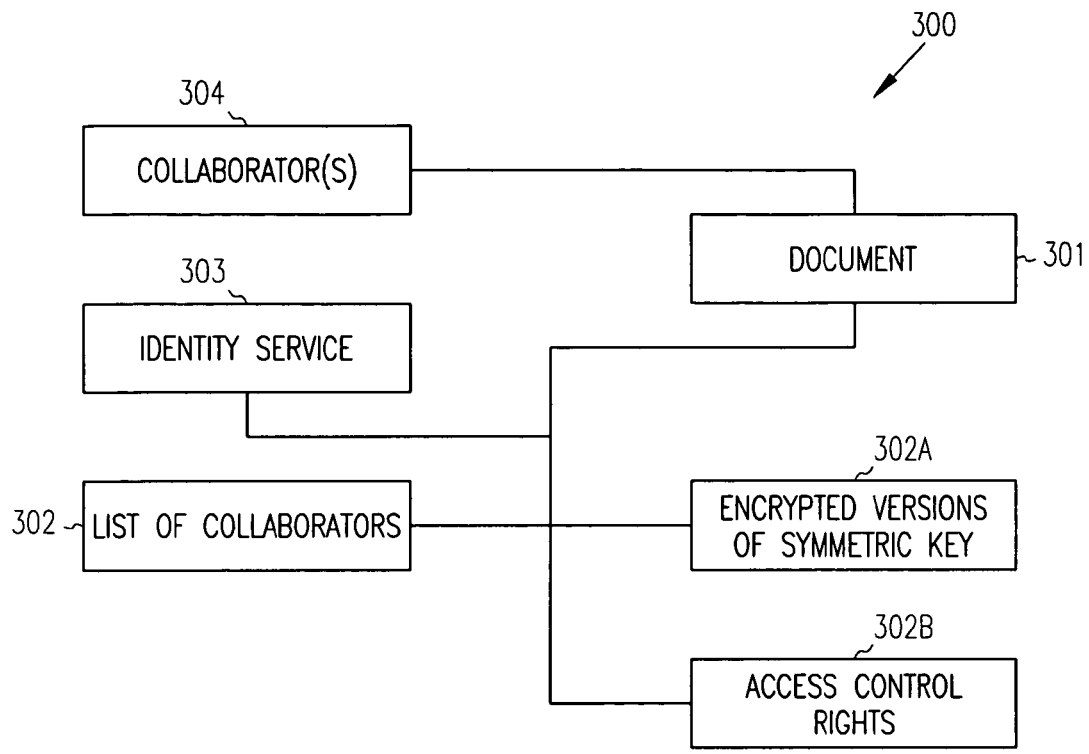
FIG. 3 is a diagram of a dynamic collaborative document security system.

FIG. 3 is a diagram of a dynamic collaborative document security system 300. The dynamic collaborative document security system 300 is implemented in a computer readable medium and is accessible over a network or any combinations of networks interfaced together. In some embodiments, the dynamic collaborative document security system 300 implements methods 100 or methods 200 of FIGS. 1 and 2, respectively.

The dynamic collaborative document security system 300 includes a document 301, a list of collaborators 302, and an identity service 303. The document 301 is content, a resource, a file, a directory, or a service. Access to the document 301 is granted to anyone having a valid symmetric key. The symmetric key includes the identities of all authorized collaborators 304 and is closely guarded and managed. The identities of the authorized collaborators are included within a list of collaborators 302.

The list of collaborators 302 can be embedded within, linked to, or indexed to the document 301. Additionally, the list of collaborators 302 is associated with encrypted versions of the document's symmetric key 302A, and in some embodiments access control rights or edit rights 302B associated with each particular collaborator 304. Each identifier associated with a specific collaborator 302 is associated with a unique version of the symmetric key 302A within the list of collaborators 302. Each version of the symmetric key 302A is encrypted with a public key of a specific collaborator 304.

It should be noted that not all collaborator identifiers included within the list of collaborators 302 include an encrypted version of the symmetric key 302A. This occurs when authorized collaborators 304 have not provided a valid public key. Moreover, not all the encrypted versions of the symmetric key 302A included encryption which can be successfully decrypted by authorized collaborators 304. This occurs when a particular collaborator 304 does not have its needed private key associated with the public key which was used to produce an encrypted version of the symmetric key 302A or occurs when a particular collaborator 304 has dynamically changed its public key.

The identity service 303 is a special type of service included within the list of collaborators 302. The identity service 303 can dynamically validate trusted relationships via community lists and dynamically evaluate trust specifications and relationship contracts between the document 301 and the collaborators 304. The identity service 303 can thus dynamically add or remove collaborators 304 from the list of collaborators 302. When this occurs, the identity service 303 re-generates a newer version of the symmetric key to reflect the proper identities of authorized collaborators 304, and the identity service 303 generates newer encrypted versions of the symmetric key 302A.

The identity service 303 can also act as an intermediary on behalf of a trusted and authenticated collaborator 304 for purposes of acquiring that collaborator's strongly rooted private-public key pair from a key service (e.g., Verisign). Additionally, the identity service 303 can dynamically accept new public keys from authorized and trusted collaborators 304. In these instances, the identity service 303 uses its own public-private key pair to acquire a decrypted version of the symmetric key and then uses the newly acquired dynamic public key to produce a new encrypted version of the symmetric key for a collaborator 304.

In some embodiments, where a particular collaborator 304 provides a dynamic change to its public key, that new public key may need to be communicated to the remaining authorized collaborators 304. This may occur when the document 301 is signed when a collaborator 304 changes it. In these situations, the identity service 303 can provide the new public key in a push (broadcasts to other collaborators 304 when new public key is received) or pull (selectively given to collaborators 304 when needed by them) fashion.

Figure 4:
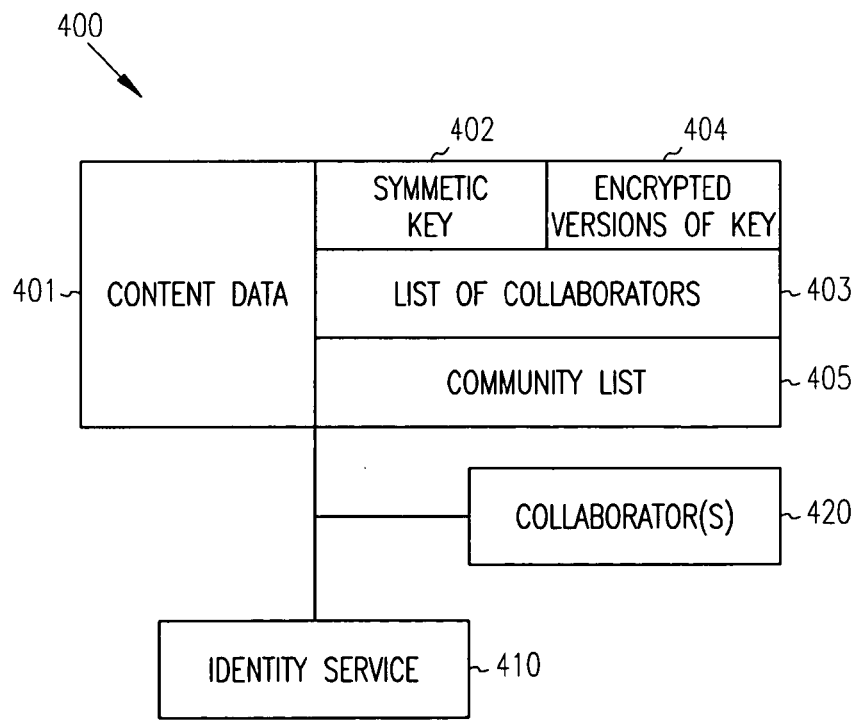
FIG. 4 is a diagram representing a collaborative document.

FIG. 4 is a diagram of a document 400 which is the being collaborated over a network. The document 400 is implemented in a computer readable medium and interfaces with a variety of services. In one embodiment, the document 400 is consumed and accessed by services described above with respect to FIGS. 1-3.

The document 400 includes content data 401, a symmetric key 402, and a list of collaborators 403. Optionally, the document 400 includes a plurality of encrypted versions of the symmetric key 404 and a community list 405. The document's content data 401 can be a file, directory, resource, or service. Additionally, the symmetric key 402 and the list of collaborators 403 need not be contiguously stored with the content data 401. That is, the association between the content data 401, the symmetric key 402, and the list of collaborators 403 is logical and need not be physical, although in some instances it can be physical.

The list of collaborators 403 includes the identity of an identity service 410 and a plurality of identities associated with other authorized collaborators 420. The identity service 410 dynamically manages the symmetric key 402, the list of collaborators 403, and the encrypted versions of the symmetric key 404. The identity service 410 uses the community list 405, trust specifications, and contracts for relationships to determine what actions can be dynamically performed with respect to requesting collaborators 420.

The identity service 410 is capable of dynamically adding or removing select collaborators 420 from the list of collaborators 403. When this occurs, the identity service 410 generates a newer version of the symmetric key 402 and produces newer encrypted versions of the symmetric key 404. Further, the identity service 410 is capable of dynamically accepting a new, initial, or changed public key on behalf of an authorized collaborator 403. When this occurs, the identity service 410 uses its own private-public key pair to decrypt the symmetric key 402 and then uses the new public key to produce a usable encrypted version of the symmetric key 404 for the needing collaborator 420.

In some embodiments, the identity service 410 can be used by a requesting collaborator 420 for purposes of acquiring a strongly rooted private-public key pair on behalf of collaborator that does not have access to its private key. This occurs by the identity service 410 acting as a conduit between the requesting collaborator 420 and a key service (e.g., Verisign).

Moreover, in some instances, the identity service 410 can be used to restrict or monitor access associated with a particular collaborator 420 based on access control rights or edit rights associated with a particular collaborator 420.

It is now apparent, how document collaboration can be managed in a dynamic and chaotic environment that reflects the current real world situation. Access and security are dynamically managed and monitored. Conventionally, this was not possible.

Although specific embodiments have been illustrated and described herein, those of ordinary skill in the art will appreciate that any arrangement calculated to achieve the same purpose can be substituted for the specific embodiments shown. This disclosure is intended to cover all adaptations or variations of various embodiments of the invention. It is to be understood that the above description has been made in an illustrative fashion only. Combinations of the above embodiments, and other embodiments not specifically described herein will be apparent to one of ordinary skill in the art upon reviewing the above description. The scope of various embodiments of the invention includes any other applications in which the above structures and methods are used. Therefore, the scope of various embodiments of the invention should be determined with reference to the appended claims, along with the full range of equivalents to which such claims are entitled.

It is emphasized that the Abstract is provided to comply with 37 C.F.R. §1.72(b), which requires an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in single embodiments for the purpose of description. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. The following claims are hereby incorporated into the Detailed Description, with each claim standing on its own as a separate preferred embodiment.

What is claimed is:

1. A method for dynamically managing security associated with document collaboration, comprising:
   associating collaborators with different encrypted versions of a key, wherein decrypted versions of the key permit access to a document; and
   adding an identity service as one of the collaborators, wherein the identity service is capable of dynamically adjusting encryption formats for one or more of the collaborators' encrypted keys, and wherein a trust specification is associated with the document and a particular collaborator, the trust specification identifies a contract that defines a relationship between the particular collaborator and the document, and wherein the contract defines policies, authentication requirements, and identity information required before the particular collaborator is dynamically added to or removed from the collaborators that have access to the document.

2. The method of claim 1 further comprising, dynamically adding or removing one or more of the collaborators.

3. The method of claim 1 further comprising, linking the collaborators and encrypted keys to the document as metadata defining document access and security.

4. The method of claim 1 further comprising, embedding the collaborators and encrypted keys within a portion of the document defining document access and security.

5. The method of claim 1 wherein adding further includes recognizing a select one of the collaborators as trusted to the identity service and permitting it to provide a dynamically generated public key which the identity service uses to encrypt a select one of the encrypted keys associated with the trusted collaborator.

6. The method of claim 5 wherein adding further includes inspecting a community list associated with the document to determine if the select one of the collaborators is authorized to be the trusted.

7. The method of claim 1 signing the document by a select one of the collaborators which modifies the document, wherein the signature is associated with a public key of the select collaborator.

8. The method of claim 1 further comprising:
   changing the key; and
   updating the encrypted versions of the key with the changed key.

9. A method for dynamically managing security associated with Document collaboration, comprising:
   identifying a collaborator associated with a document;
   verifying a trust relationship between the collaborator and the document;
   acquiring a dynamic public key from or on behalf of the collaborator;
   decrypting a symmetric key which grants access to the document; and
   encrypting the symmetric key with the dynamic public key, and wherein a trust specification is associated with the document and the collaborator, the trust specification identifies a contract that defines the trust relationship between the collaborator and the document, and wherein the contract defines policies, authentication requirements, and identity information required before the collaborator is verified for access to the document.

10. The method of claim 9 further comprising:
    recognizing that the collaborator has altered the document and signed the document with the dynamic public key; and
    communicating the dynamic public key to a plurality of other collaborators associated with the document.

11. The method of claim 9 wherein acquiring further includes acting as an intermediary between the collaborator and key service for purposes of acquiring a strongly rooted key pair for the collaborator, wherein a portion of that key pair is the public key and wherein another portion of that key pair is a private key which permits the collaborator to decrypt the encrypted symmetric key for purposes of accessing the document.

12. The method of claim 9 wherein acquiring further includes generating a non-strongly rooted private-public key pair for the collaborator.

13. The method of claim 9 further comprising:
    dynamically receiving a request from a different collaborator to access the document;
    inspecting the trust specification to ensure the access is permissible;
    receiving a public key for the different collaborator;
    generating a new symmetric key which includes the different collaborator, the collaborator, and other collaborators associated with the document; and
    encrypting the symmetric key with the public key of the different collaborator and with the dynamic public key of the collaborator and with other public keys associated with the other collaborators.

14. The method of claim 13 further comprising, communicating the public key of the different collaborator to the collaborator and to the other collaborators associated with the document.

15. The method of claim 13 wherein generating further includes generating a random new symmetric key.

16. The method of claim 13 wherein inspecting further includes inspecting community lists associated with the different collaborator and the document to ensure that the different collaborator can be dynamically added as a new collaborator to the document.

17. The method of claim 9 wherein verifying further includes authenticating the collaborator to the document according to a contract.

18. A dynamic collaborative document security system, comprising:
    a document;
    a list of collaborators associated with the document; and
    an identity service, wherein the identity service is included within the list of collaborators, and wherein the identity service dynamically manages encryption of a symmetric key associated with the document and dynamically manages identities of the list of collaborators according to a trust specification, wherein access to a decrypted version of the symmetric key provides access to the document, and wherein the document maintains the list of collaborators and the list of collaborators includes identities for each unique collaborator that can permissibly access the document.

19. The dynamic collaborative document security system of claim 18 wherein each entry within the list of collaborators includes a specific encrypted version of the symmetric key, each specific encrypted version is encrypted with a specific public key of a specific collaborator included within the list of collaborators.

20. The dynamic collaborative document security system of claim 18 wherein the identity service changes the symmetric key and re-performs encryption when a specific collaborator is dynamically added to or dynamically removed from the list of collaborators.

21. The dynamic collaborative document security system of claim 18 wherein the identity service dynamically acquires a strongly rooted public-private key pair on behalf of a requesting collaborator from a keying service.

22. The dynamic collaborative document security system of claim 18 wherein the identity service dynamically generates a non-strongly rooted public-private key pair on behalf of a requesting collaborator.

23. The dynamic collaborative document security system of claim 18 wherein the identity service determines if a dynamically generated public key associated with a specific collaborator of the list of collaborators has signed the document after altering the document, and wherein if this occurs the identity service communicates the dynamically generated public key to the remaining collaborators included within the list of collaborators.

24. The dynamic collaborative document security system of claim 18 further comprising access control rights associated with each collaborator included within the list of collaborators.

25. A document residing in a computer readable medium, comprising:

a document having content data, the symmetric key and a list of collaborators;

the symmetric key; and the list of collaborators, each collaborator within the list associated with a specific encrypted version of the symmetric key, wherein an identity service is included within the list of collaborators, the identity service capable of dynamically adding and removing select ones of the collaborators and capable of dynamically re-encrypting the symmetric key for the select ones of the collaborators, and wherein the document maintains the list of collaborators and the list of collaborators includes identities for each unique collaborator that can permissibly access the document.

26. The document of claim 25, wherein the symmetric key and the list of collaborators are metadata linked with the content data.

27. The document of claim 25 further comprising, a trust specification that defines relationships between collaborators and the document, and wherein the trust specification drives the actions of the identity service.

28. The document of claim 25 further comprising, a community list which is consumed by the identity service, the community list identifying collaborators which can be dynamically added to the list of collaborators.

29. The document of claim 25 wherein members of the list of collaborators have been granted access control rights or edit rights to the document via the identity service which determines the access control rights or edit rights based on a trust specification for the document.

30. The document of claim 25 wherein the identity service communicates a trust specification of the document dynamically to another service, and wherein that service uses the trust specification to dynamically manage access to the document.

* * * * *